(12) United States Patent
Williams, III

(10) Patent No.: US 7,099,835 B2
(45) Date of Patent: Aug. 29, 2006

(54) METHODS AND SYSTEMS FOR PROVIDING LIFE MANAGEMENT AND ENHANCEMENT APPLICATIONS AND SERVICES FOR TELEMATICS AND OTHER ELECTRONIC MEDIUM

(75) Inventor: Lawrence E. Williams, III, Newport Beach, CA (US)

(73) Assignee: Roadside Telematics Corporation, Newport Beach, CA (US)

( * ) Notice: Subject to any disclaimer, the term of this patent is extended or adjusted under 35 U.S.C. 154(b) by 317 days.

(21) Appl. No.: 09/748,729

(22) Filed: Dec. 26, 2000

(65) Prior Publication Data

US 2001/0014863 A1    Aug. 16, 2001

(51) Int. Cl.
G06Q 30/00    (2006.01)

(52) U.S. Cl. .......................................... 705/26; 701/201

(58) Field of Classification Search .................. 705/26, 705/27; 701/201
See application file for complete search history.

(56) References Cited

U.S. PATENT DOCUMENTS

| | | | | |
|---|---|---|---|---|
| 6,028,537 | A * | 2/2000 | Suman et al. ............. | 340/988 |
| 6,535,743 | B1 * | 3/2003 | Kennedy, III et al. ...... | 455/456 |
| 2002/0103622 | A1 | 8/2002 | Burge | |

FOREIGN PATENT DOCUMENTS

JP         404057198 A  *  2/1992

OTHER PUBLICATIONS

Charles Mason, "Wireless Internet gives auto industry the buzz," published on Dec. 1, 1999 in America's Network, downloaded from the internet Apr. 10, 2003.*

InfoGation Corp. Introduces Productivity, Navigation, Safety and Communication Software Applications for Next-Generation Smart Car Systems, PR Newswire, New York, Jan. 8, 1998, downloaded from the Internet on Apr. 10, 2003.*

"Companies Jumping at GPS-wireless market opportunities for personal location, E-911." Global Positioning and Navigation News, Potomac, Oct. 7, 1998, vol. 8, Iss. 20, p. 1.*

"Holiday Autos/OnBoard Help/Concierge Systems/They can send aid, find a stolen car and make reservations." Shuldiner, Herb. Newsday, Long Island, NY, Dec. 27, 1998. p. H11.*

Clifford enters telematics with net-based car PC, Anonymous. TWICE. New York: Jan. 24, 2000.vol. 15, Iss. 3; p. 40, 1 pgs, downloaded from ProQuest on the Internet on Oct. 10 2005. 2 pages.*

Ford to Bring Internet to Millions of Vehicles, PR Newswire. New York: Jan. 9, 2000. p. 1, downloaded from the ProQuest on the Internet on Oct. 10, 2005, 3 pages.*

Mercedes-Benz First With Web-Based in-Car Info Services Tele Aid Standard on Every 2001 Model; Info Services Optional, PR Newswire. New York: Sep. 14, 2000. 3 pages, downloaded from ProQuest on the Internet on Jun. 8, 2006.*

* cited by examiner

Primary Examiner—Jaime E. Zurita
(74) Attorney, Agent, or Firm—Pillsbury Winthrop et al.

(57) ABSTRACT

The invention presented herein relates to methods and systems for providing life management and enhancement applications and services to customers via an electronic medium such as the Internet. In addition, the present invention is directed to business-to-business and business-to-customer applications that provide customer-centric and "reverse retailing" services to customers. The life management and enhancement applications and services are provided to customers through a central online location such as the Internet portal. A system and method according to one particular embodiment of the present invention describes an application for providing telematics services to the customer.

19 Claims, 6 Drawing Sheets

METHODS AND SYSTEMS FOR PROVIDING LIFE MANAGEMENT AND ENHANCEMENT APPLICATIONS AND SERVICES FOR TELEMATICS AND OTHER ELECTRONIC MEDIUM

FIELD OF THE INVENTION

The present invention relates to methods and systems for providing life management and enhancement applications and services to customers for telematics and other electronic medium. More particularly, the present invention is directed to a business method for providing life management and enhancement services to customers via an electronic medium such as the Internet. In addition, the present invention is directed to business-to-business, business-to-government, customer-to-government, and business-to-customer applications that provide customer-centric and "reverse retailing" services.

BACKGROUND OF THE INVENTION

The Internet continues to grow in popularity and is becoming an integral part of every day life as more and more people and businesses use it for various reasons. For example, businesses use the Internet to promote their products and services with hopes that consumers will use and purchase them. Thus, without question, many businesses believe that presence on the Internet is an important and necessary component for staying competitive in today's marketplace.

There are currently thousands of businesses that advertise, promote, and sell their products/services through the Internet. These businesses generally maintain and manage their own web sites and pages to advertise and sell their products and services. In other instances, businesses can advertise at other businesses' web sites and pages via banners, links, and the like.

It is anticipated that in the near future, there will be billions of Internet users worldwide. Many of these users will use the Internet to shop for products and services because it saves them time and money and provides convenience by allowing them to shop at home. Internet users can compare prices, products, and services by visiting one web page to another in a matter of seconds, thus enriching their shopping experience.

Many users also use the Internet to obtain information about anything imaginable since information on the Internet is generally free. However, in many instances, users have to search for hours and hours for particular information because of the vast amount of information on the Internet. In general, information on the Internet is not well organized, and there exists no comprehensive system for providing an efficient manner of searching for particular information. As a result, users may become easily frustrated and expend a considerable amount of time on the Internet without finding the desired information.

In today's highly competitive global marketplace, there is a great need for businesses to provide the most optimal service to their customers. In particular, Internet users are constantly seeking products and services that manage and enrich their lives. Currently, there are a number of segregated businesses on the Internet that offer specialized life management and enrichment products and services. For example, there are buying services such as e-retailers www.autobytel.com (cars) and www.barnesandnoble.com (book sales), auction and discount services such as www.e-bay.com (auctioning products) and www.priceline.com (reverse auctioning airline tickets), personal information management services (calendar and events) such as www.when.com and www.jump.com, search engines such as www.4anything.com, and the like (all web sites above believed to be a registered trademarks). Recently, the rapid expansion of such specialized life management and enhancement businesses on the Internet has resulted in extreme segregation, fragmentation, and inefficiencies in the marketplace. As a result, their customers are finding out that it is quite tedious and cumbersome to use the Internet for various life management and enrichment services.

Another shortcoming associated with prior art life management and enhancement services on the Internet is that there is no convenient and efficient means of finding such services. Consumers may spend hours or even days searching for a particular product or service on the Internet. The inventor of the present invention believes that no comprehensive system exists today that allows consumers to find life management and enhancement applications and services from a single web site (i.e., portal) on the Internet.

It is anticipated that in the near future many vehicles or automobiles will be equipped with telematics systems (i.e., wireless and global positioning systems). Currently, telematics services are provided to consumers using telematics service providers and telematics devices. The telematics device can be a hand-held device or one embedded in the vehicle or automobile.

Accordingly, there is a need for methods and systems for providing life management and enhancement applications and services to consumers in an efficient and timesaving manner, while at the same time providing an enjoyable online experience. Further, there is also a need for a customer relationship management method and system allowing businesses to provide customer-centric and "reverse retailing" services to their customers via the Internet.

SUMMARY OF THE INVENTION

In view of the above-described problems of the prior art, it is an object of the present invention to provide life management and enhancement applications and services to customers.

It is another object of the present invention to provide a business method for providing life management and enhancement applications and services to customers via an electronic medium such as the Internet.

It is a further object of the present invention to provide life management and enhancement applications and services to customers through a central online location.

It is yet another object of the present invention to provide highly efficient, effective, organized, and comprehensive life management and enhancement applications and services to customers using customer-centric and reverse retailing principles.

It is a further object of the present invention to provide business-to-business, business-to-government, customer-to-government, and business-to-customer life management and enhancement applications and services to customers via the Internet.

It is yet another object of the present invention to provide an Internet-based customer relationship management application to businesses on the Internet.

It is still another object of the present invention to provide life management and enhancement services to telematics customers.

It is another object of the present invention to provide a system and method for providing applications and services to support emergency roadside assistance.

These and other objects are achieved according to a first aspect of the present invention by providing life management and enhancement applications and services to customers from a central online location. The present invention integrates multiple online services relating to life management and enhancement into a central online location (i.e., web site or portal). The central online location is used for archival, management, and enhancement of personal data, profiles, reminders, search engines, e-retailers, and the like.

A second aspect of the present invention focuses primarily on business-to-business, business-to-government, customer-to-government, and business-to-customer applications by providing businesses, customers, and the government various business opportunities using the information stored in the central online location. Such information can be used by these e-businesses and/or traditional "brick and mortar" businesses for reverse retailing, or stated alternatively, using the information as a means for reaching out to potential customers who are seeking specific services.

BRIEF DESCRIPTION OF THE DRAWINGS

These and other objects and advantages of the present invention will become apparent and more readily appreciated from the following detailed description of the presently preferred exemplary embodiments of the invention taken in conjunction with the accompanying drawings, of which.

DETAILED DESCRIPTION OF THE PREFERRED EMBODIMENTS

Figure 1:
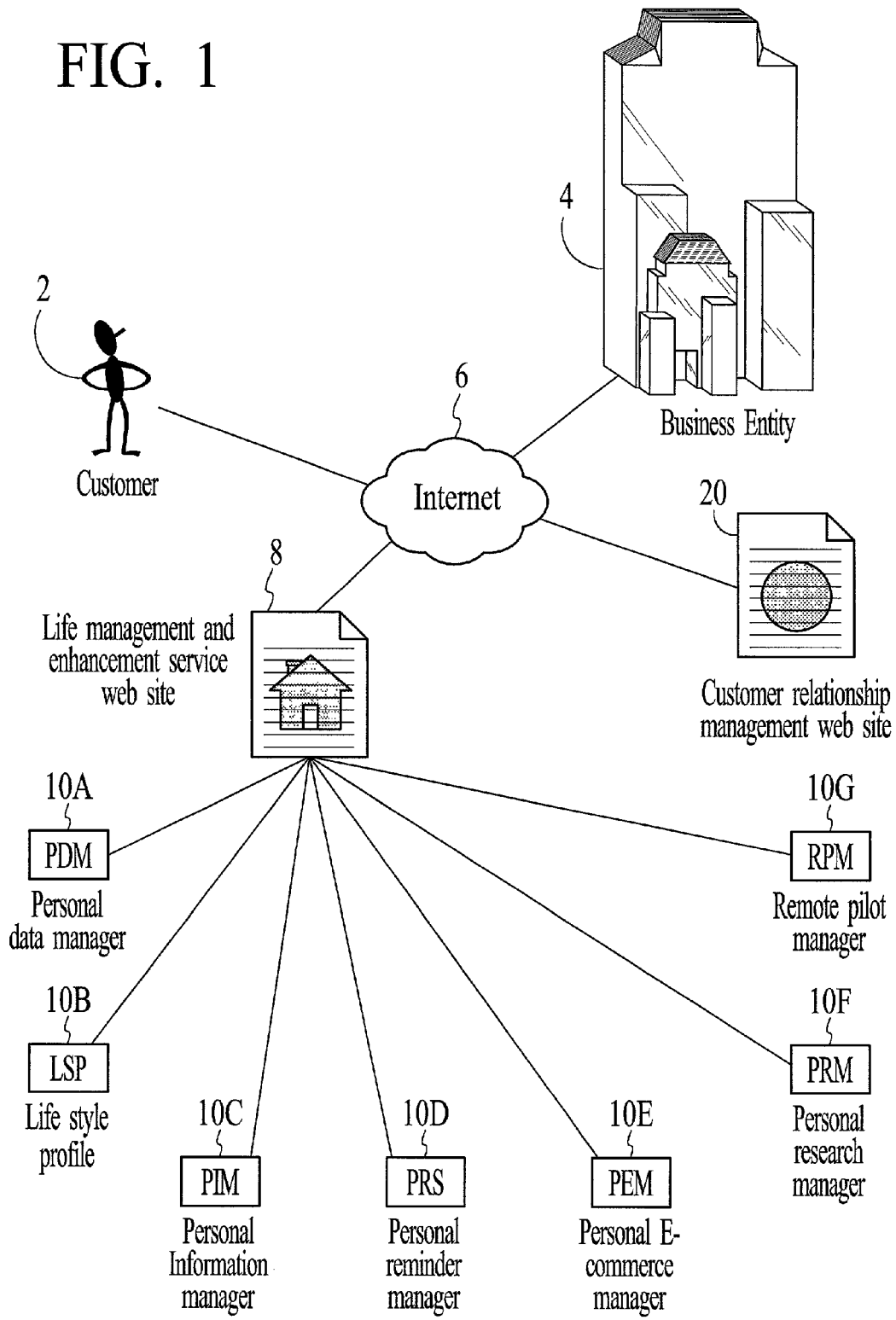
FIG. 1 illustrates a simplified diagram showing a customer, business entity, a life management and enhancement service web site, and a customer relationship management web site in accordance with the preferred embodiment of the present invention.

The present invention will now be described in greater detail, which will serve to further the understanding of the preferred embodiments of the present invention. As described elsewhere herein, various refinements and substitutions of the various embodiments are possible based on the principles and teachings herein.

The preferred embodiments of the present invention will now be described with reference to FIGS. 1–6, wherein like components, services, applications, and steps are designated by like reference numerals throughout the various figures. Further, specific details and parameters are provided herein and are intended to be explanatory rather than limiting.

The present invention relates to methods and systems for providing life management and enhancement applications and services to customers via an electronic medium such as the Internet. The present invention is also directed to business-to-business, business-to-government, customer-to-government, and business-to-customer applications that provide customer-centric and reverse retailing services. In addition, the present invention is directed to a system that maintains a database of customer information that can be used by customers, e-businesses and/or "brick and mortar" businesses to provide the customer-centric and reverse retailing services.

The presently preferred embodiment of the invention is implemented through an electronic medium such as the Internet and relates to life management and enhancement services. However, the present invention is applicable in any category or industry, in which a comprehensive management and enhancement applications and services are needed, such as in business, government, sports, automotive, entertainment, health, recreation, family, home, travel, computer, food, pet, personal and the like. For example, in the telematics services industry, a comprehensive roadside emergency service is provided to the customers, which is described in greater detail later herein.

FIG. 1 illustrates a simplified diagram showing a customer, business entity, a life management and enhancement service web site, and a customer relationship management web site in accordance with the preferred embodiment of the present invention. It is noted that multiple customers and business entities are implemented in the preferred embodiment of the present invention, but only one customer and one business entity is described herein for simplicity.

In the preferred embodiment, a customer 2 and a business entity 4 access the Internet 6 using one or many commercially available browsers such as Netscape Navigator (believed to be a Registered Trademark of Netscape Corp.) and Microsoft Internet Explorer (believed to be a Registered Trademark of Microsoft Corp.). Through the Internet 6, the customer 2 can visit the life management and enhancement service (LMES) web site 8. As described above and in greater detail hereinafter, the LMES site 8 is a well-organized comprehensive site that enables the customer 2 to obtain life management and enhancement services in an efficient and effective manner. The LMES site 8 preferably includes applications and services such as a personal data manager (PDM) 10A, life style profile (LSP) 10B, personal information manager (PIM) 10C, personal reminder manager (PRM) 10D, personal e-commerce manager (PEM) 10E, personal research manager (PRM) 10F, and remote pilot manager (RPM) 10G, which applications and services are described in greater detail later herein. It is also important to note that other applications and services than those described herein can be used in the present invention as will be apparent to those skilled in this art.

When the customer 2 registers with and visits the LMES site 8, the customer 2 can use the various applications and services from this central location without having to visit other, unlinked web sites. The LMES site 8 can be used to store personal profiles for the customer 2, which profiles can be used by e-businesses and/or "brick and mortar" businesses such as the business entity 4 to provide customer-centric and "reverse retailing" services. For example, the business entity 4 can use the information stored in the LMES site 8 to develop a relationship with the customer 2. This is accomplished by providing a customer relationship management (CRM) web site 20 to the business entity 4. In this manner, the business entity 4 uses the CRM site 20 to access customer specific and/or aggregate information from the LMES site 8 such that this information can be used to provide customer-centric services to the customer 2. Preferably, the customer 2 has control over the type and amount of personal information that he/she desires to be available to the business entity 4. This aspect of the present invention is described in greater detail later herein. Further, both the LMES and CRM sites 8, 20 are preferably password protected giving access to customers and business entities having the appropriate passwords and usernames.

Figure 2:
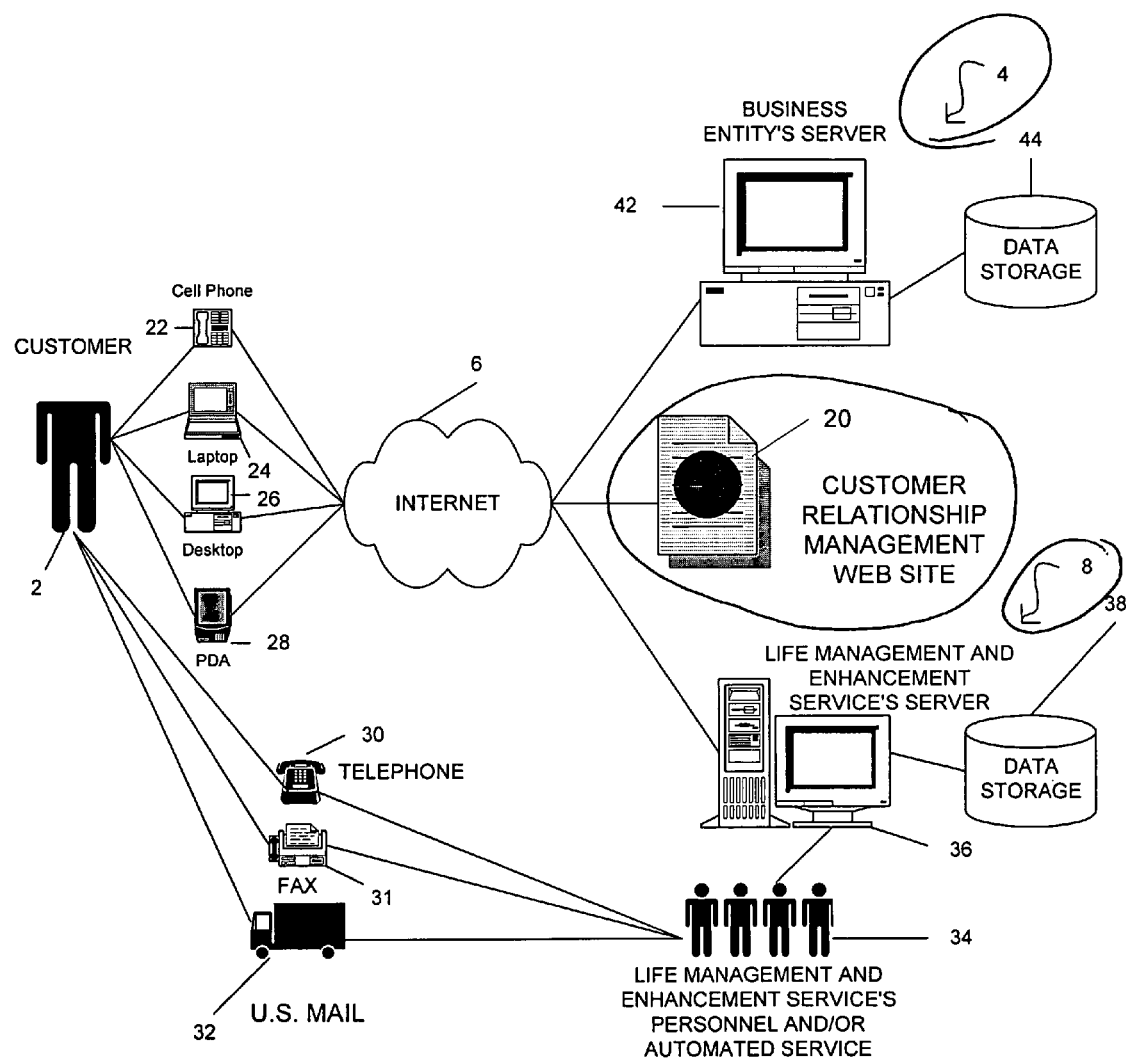
FIG. 2 illustrates a system level diagram of FIG. 1 in accordance with the preferred embodiment of the present invention.

FIG. 2 illustrates a system level diagram of FIG. 1 in accordance with the preferred embodiment of the present invention. As illustrated, the customer 2 can access the LMES site 8 using various methods. Preferably, the customer 2 uses a customer device such as a cellular phone 22 (with Internet access capabilities), laptop computer 24, desktop computer 26, PDA (portable digital assistant) 28, and the like to access the Internet via a physical or wireless (e.g., Bluetooth technology) connection. The customer 2 can communicate to/from the LMES site 8 via email, real time chatting, and the like. The customer device can be any device such as a telematics device so long as the customer 2 can view, transmit, and receive electronic data via the Internet 6. Alternatively, although not the preferred embodiment, the customer 2 can access the LMES site 8 indirectly by using a home telephone 30, fax 31, or mail service 32 to contact LMES's personnel 34 and/or an automated service. The LMES's personnel 34 and/or the automated service can then access the LMES site 8 fulfilling any request from the customer 2. This may be the case when there are electrical power outages and/or server problems.

The LMES web site 8 is preferably associated with a server (web and/or email) 36. As known, an email server is traditionally used to manage, send, and receive an email to/from the customer 2, while a web server is used to support and manage web sites. Further connected to the server 36 is a data storage/database 38 to store and save customer specific data, profiles, events, and the like, as described in more detail below.

The business entity 4 can be associated with its own server 42 similar to the server 36 for managing, maintaining, etc, its own data and applications. In addition, another data storage/database 44 is connected to the server 42 for storing and saving data. Although shown externally to the servers 36, 42, the data storage/databases 38, 44 can be placed internally in the servers 36, 42.

Once the customer 2 is linked (hardwire or wireless) to the LMES site 8, the customer 2 can obtain life management and enhancement applications and services such as an on-board database to support emergency roadside assistance. Likewise, when the business entity 4 is linked to the LMES site 8 and/or CRM site 20, customer-centric and reverse retailing services can be provided to the customer 2. These services can be provided to the customer 2 via the telephone, mail, email, Internet, and the like.

Figure 3:
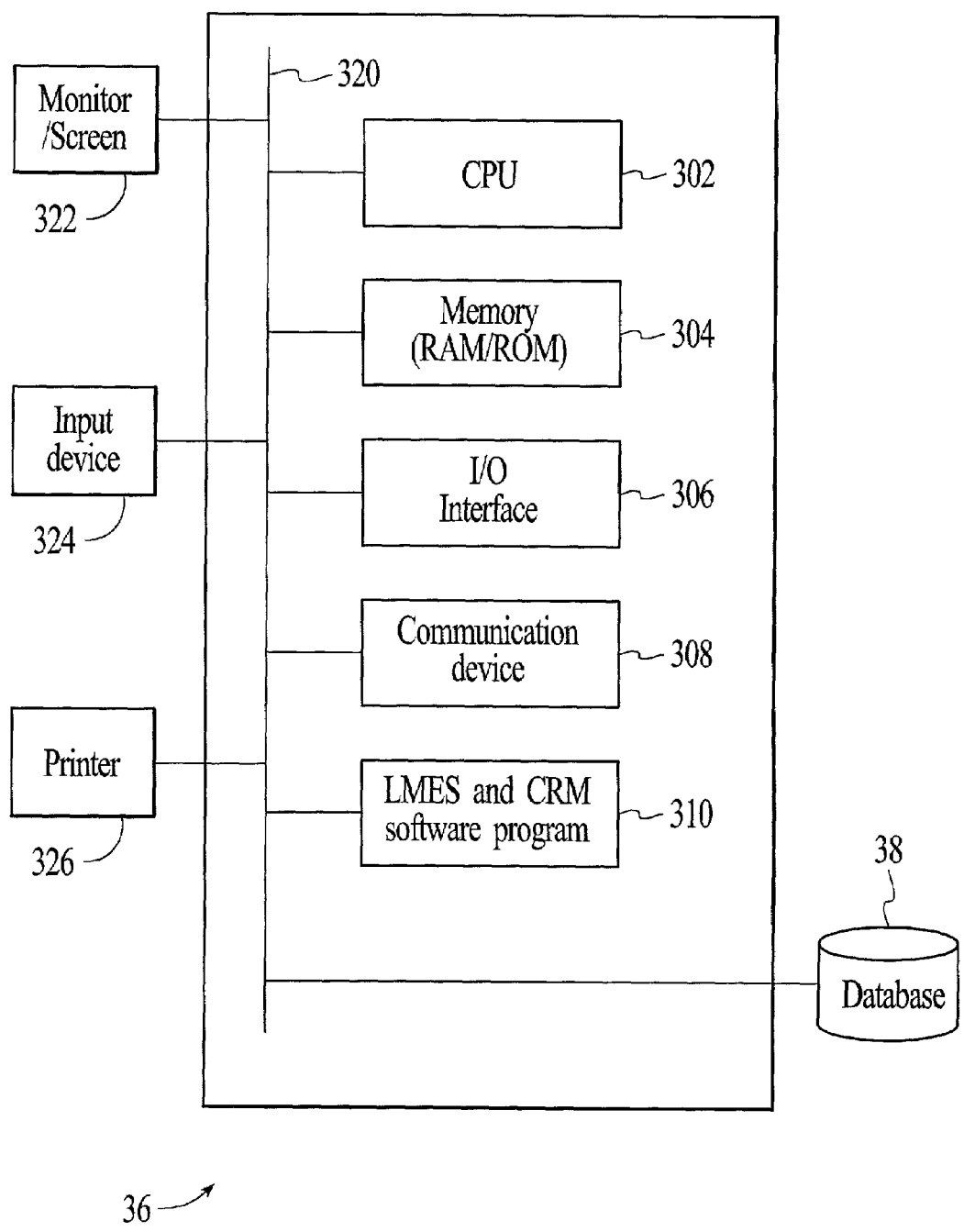
FIG. 3 illustrates a block diagram of a web server in accordance with the preferred embodiment of the present invention.

FIG. 3 illustrates a block diagram of a web/email server in accordance with the preferred embodiment of the present invention. The server 36, which is used to implement the present invention, includes a processor such as CPU 302, internal memory (RAM, ROM) 304 and I/O interface 306, which are coupled to a bus 320. The bus 320 may include multiple physical buses interconnected by bridges, adapters, controllers, and the like. Further coupled to the bus 320 is a communication device 308 for transmitting and receiving data via the Internet. The communication device 308 provides the server 36 with connections to the Internet and may be any device suitable for such purpose, such as a conventional modem, ISDN adapter, xDSL modem, cable modem, wireless, etc. The server 36 may also include I/O devices such a monitor (screen) 322, input device (keyboard, pointing device, microphone) 324, and printer 326, which are also coupled to the bus 320.

In addition to the conventional components described above, a LMES (life management and enhancement service) and CRM (customer relationship management) software program 310 is included in the server 36 for running applications and managing the data storage/database 38. The software program 310 can also include searching, sorting, and organizing capabilities for the data storage/database 38. The functional components described herein are preferably implemented through the LMES and CRM software program 310 that is processed by the CPU 302. Those of ordinary skill in the art will recognize other combinations of hardware and software components are readily applicable in the present invention, and that more than one software program 310 can be used for providing the LMES and CRM applications and services.

As will be apparent to those skilled in the art, the server 36 can run any of numerous operating systems, and the software program 310 can be implemented in any of numerous appropriate computer programming languages or combinations thereof, although, preferably, it is implemented, at least in part, in a language that is suitable for database access and manipulation.

The database 38 coupled to the bus 320 preferably includes a non-volatile storage medium such as CD-ROM, DVD, magneto-optical storage, external ROM, etc. The database 38 is used to store and save information pertaining to each customer and business entity. Other components which are not illustrated herein, but which are commonly used in the server 36, may also be included herein.

Figure 4:
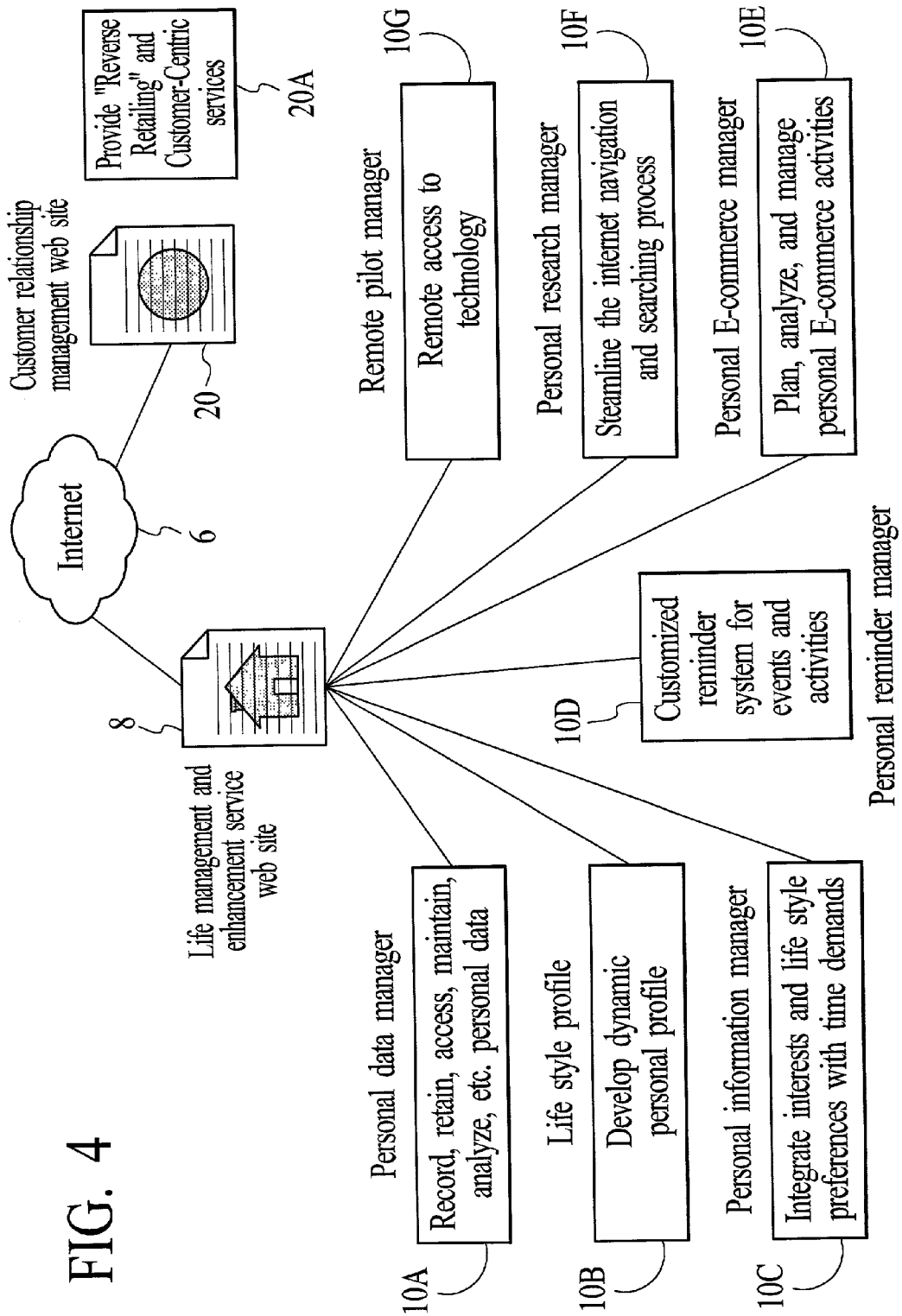
FIG. 4 illustrates a more detailed diagram of the various applications available to customers and business entities in accordance with the preferred embodiment of the present invention.

FIG. 4 illustrates a more detailed diagram of the various applications available to customers and business entities in accordance with the preferred embodiment of the present invention. As described above, there are two related aspects of the present invention: (1) life management and enhancement services (LMES) web site 8; and (2) customer relationship management (CRM) web site 20. These two aspects of the present invention will now be described in greater detail.

In the first aspect of the invention, the LMES site 8 is a comprehensive life management and enhancement Internet web site or portal that allows customers to manage and control daily life activities. Customers can then enjoy all aspects of their lives more fully using the various applications and services available on the LMES site 8. First, a personal data manager (PDM) 10A on the LMES site 8 allows customers to record, retain, access, maintain, and analyze a wide variety of personal data relating to physical fitness, diet, health, family, friends, insurance policies, vehicle ownership, music, books, financial plans, etc., thereby creating an easily accessible and secure one-stop repository of personal data.

Second, a life style profile (LSP) application 10B allows the customer to develop a dynamic personal profile based upon the customer's life interests and preferences. For example, customer's profile may include the customer's favorite music, foods, books, clothing, brand names, vacation destinations, and the like.

Third, a personal information manager (PIM) 10C allows the customer to integrate personal data and profiles from the PDM 10A and LSP 10B with a personal time management tool, respectively, to generate a personal calendar/time manager with activities and events found on the Internet through web sites such as www.moviefone.com, www.culterfinder.com, www.reel.com, www.tvdata.com, and the like. For instance, the customer can plan and schedule a particular Opera show on the calendar through the PIM 10C by integrating the LSP application 10B and the web site www.culturefinder.com.

Fourth, a personal reminder system (PRS) 10D allows the customer to receive reminders for appointments, meetings, anniversaries, birthdays, events, activities, and other important times/dates. For example, a daily list of appointments and activities can be available to the customer using the PRS 10D as it accesses the PIM 10C data. In another example, one-week advance reminders of birthdays or scheduled maintenance of a car can be automatically presented to the customer by the PRS 10D. Preferably, the PRS 10D is fully integrated with the PDM 10A, LSP 10B, and PIM 10C applications. In this manner, the customer can also receive reminders via the PIM 10C. The frequency (i.e., hourly, daily, weekly, etc.) of alerting the customer of the reminders is selected by the customer.

Fifth, a personal e-commerce manager (PEM) 10E allows the customer to plan, analyze, and manage personal e-commerce activities with full integration with other LMES applications and services. For example, the PEM 10E can be used to "pull" and receive suggested book titles set at a certain price and delivery date from an e-retailer such as www.barnesandnoble.com. Working in conjunction with the PDM 10A, the PEM 10E can notify the customer that a preferred author's newest book will be available on a specific date, at a specific price and suggest to the customer that he/she should order the book. A link can be created to a pre-completed or completed order form for the book, and a second link or button can be used to order the book. The PEM 10E can capture and store the details of each e-commerce transaction for the customer.

The customer can fill out evaluation forms to document his/her experience or transaction for each e-business entity. These forms can then be stored in the database for analyzing and forming e-business ratings. In this manner, e-business entities can receive periodic reports of the customer's evaluations of their products and services. The PEM 10E can also be used to provide suggestions of e-commerce opportunities and merchants to customers, based on the customer's interests and preferences listed using the PDM 10A, LSP 10B, and/or PIM 10D.

Sixth, the personal research manager (PRM) 10F streamlines the cumbersome and frustrating process of Internet navigating and searching by guiding the customer to web sites that are most useful, relevant, and interesting to him/her based on personal information stored in the PDM 10A, LSP 10B, and PEM 10E databases. For example, when the customer is interested in a specific topic, the PRM 10F can suggest particular web sites with information about the specific topic, such as a news article, chat room, directory, email, message board, and the like. The PRM 10F dynamically updates and prioritizes e-communities based on the PDM 10A, LSP 10B, and PEM 10E data to ensure that the customer receives the most current, pertinent and up-to-the-minute information. Customers can also search within the database for specific information using the PRM 10F search engine.

Seventh, the remote pilot manager (RPM) 10G allows the customer to remotely access services and applications from any location in the world. For example, the customer may desire to access, via the Internet, a home appliance such as his/her refrigerator having Internet connection capabilities. As known, there are many home appliances that can store information in its database. For example, the refrigerator can have a database with information about what products are currently stored therein. The customer can remotely access the refrigerator via the Internet using the RPM 10G to obtain such information and order additional products from another web site, such as www.webvan.com (online grocery). In this manner, the customer can order the products using the RPM 10G and such products can be delivered soon after the customer arrives at his/her home.

The presently preferred embodiment of the invention is implemented with the above described seven applications and services. However, it is important to note that the present invention is applicable with any number of applications and services than those described hereinabove. It is also important to note that all such applications can work in conjunction with each other in various combinations so that applications, services, information, etc., can be shared in an efficient and effective manner.

In the second aspect of the present invention, the customer relationship management site 20 provides customer-centric and reverse retailing services. The CRM site 20 is preferably used by business entities for providing customer-centric and reverse retailing services to customers through a comprehensive management of all the steps in a customer's life. As a business-to-business application, the CRM site 20 can be used by business entities to (1) plan and design store layouts, (2) track, supervise, and maintain store plans, (3) capture and monitor customer preference, biographic, demographic and experience information, (4) advertise, (5) generate sponsorships, (6) data mine, to name a few.

The CRM site 20 allows e-businesses, government, and other entities to access specific and/or aggregate customer data and information contained in the database of the LMES site 8. This information and data can be provided in a report format via the CRM site 20. After accessing the customer data and information, the CRM site 20 can then be used to analyze and generate reports (marketing, advertising, etc.). For example, a marketing report can be provided to a music e-retailer, which report contains customer's demographics and purchasing data (i.e., frequency and volume) such that the report can be used to design and target advertising specifically for the customer.

As discussed above, the CRM site 20 can be used to provide a unique and highly effective customer-centric and reverse retailing services. This business model allows customers to drive the retailing process by identifying the products and services that are of interest to them and based upon these interests and past usage, offers for these products and services are "pulled" from the e-retailer. This is quite different from the existing model where retailers are aggressively "pushing" a constant stream of unsolicited and undesired products and services to customers in hopes of enticing them. The main difference between the conventional model and the novel business method presented herein is that in the present model, customers are in control of what, when, and how they receive and use such information. The customers are presented with various products and services that are specifically tailored towards them (i.e., customer-centric service) rather than the customer having to search and seek out specific products and services on their own. The customers can also receive offers at desired times/dates, thereby saving them valuable time and resource.

The CRM site 20 can also include software programs for tracking the web sites that the customer visits to provide feedback and periodic reports (e.g., daily, weekly, bi-monthly, monthly) regarding the customer's shopping and web-surfing habits. Such feedback and reports can be provided via hard copy or electronically to the customer and used in directing business activities. This software program should also include searching capabilities for databases.

The database can also be set up so that "back-end" information can be available to the business entities so that they can use this information for planning and directing their marketing of products and services. For example, assume that a particular customer generally requests vacation destinations in the West Coast of the U.S. If this information is known, then business entities can advertise and market vacation destinations on the West Coast to the customer whenever a special vacation package becomes available. Such activities are subject to customer activated filters.

Furthermore, based on the way the customers conduct their searches on the Internet, the software and database can determine what each specific customer regularly looks for in life management and enhancement products and services, so that when they become available, a notice can be sent out to the customer notifying him/her of the availability of the products and services. The notice may be sent via the Internet and can include a link to a web site having the products and services. In this manner, the customer receives valuable information with very little effort and time.

Figure 5:
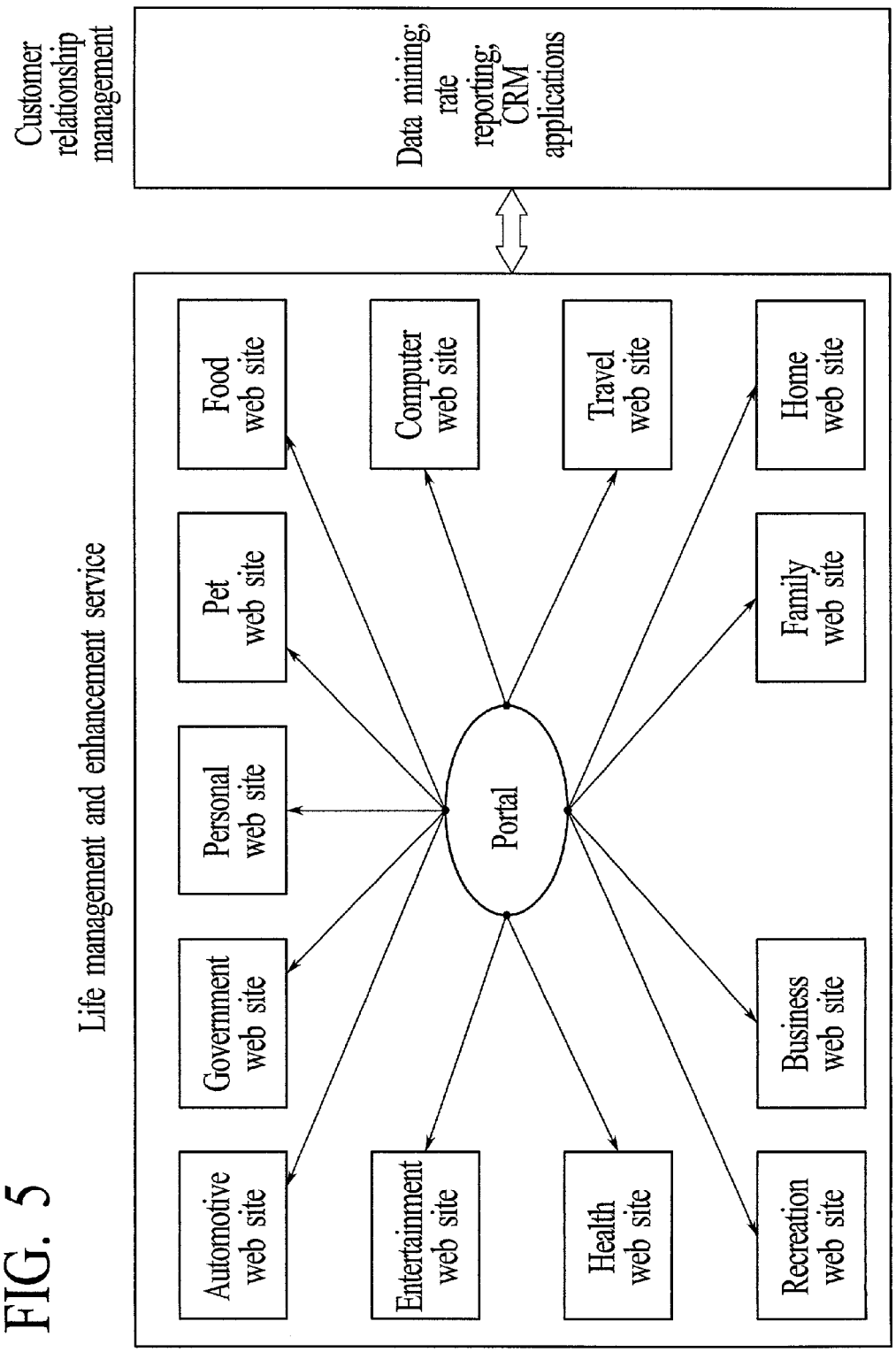
FIG. 5 illustrates an example of the various life management and enhancement services available to customers and business entities in accordance with the preferred embodiment of the present invention.

FIG. 5 illustrates an example of the various life management and enhancement services available to customers and business entities in accordance with the preferred embodiment of the present invention. In the present invention, the LMES site 8 forms alliances with other Internet content providers and directories. These content providers and directories are then integrated with the LMES site 8 applications to proactively provide the applications and services discussed above. The LMES site 8 includes an Internet portal with at least thirteen life category sites such as automotive, entertainment, health, recreation, business, family, home, travel, computer, food, pet, personal, and government. Within each of these sites, there can be hundreds and thousands of additional sub-sites that are very specialized, all of which are destination sites and serve as direct entries to the LMES site 8. The portal and each of the specific sites and sub-sites can feature their own sponsors and advertisers.

The LMES site 8 generates revenue through sponsorships, advertising, e-commerce commissions, sweepstakes hosting, and the like. The reverse retailing business model is used to deliver qualified sponsorships and advertisements to customers based upon their personal data, interests, needs, habits, and preferences. From the customers' stand point, the LMES site 8 will assist them in purchasing desirable products and services without being bombarded with unwanted advertisements and sales pitches from banners and the like. In essence, customers using the LMES site 8 determine the type and amount of exposure of particular sponsorships and advertisers.

Figure 6:
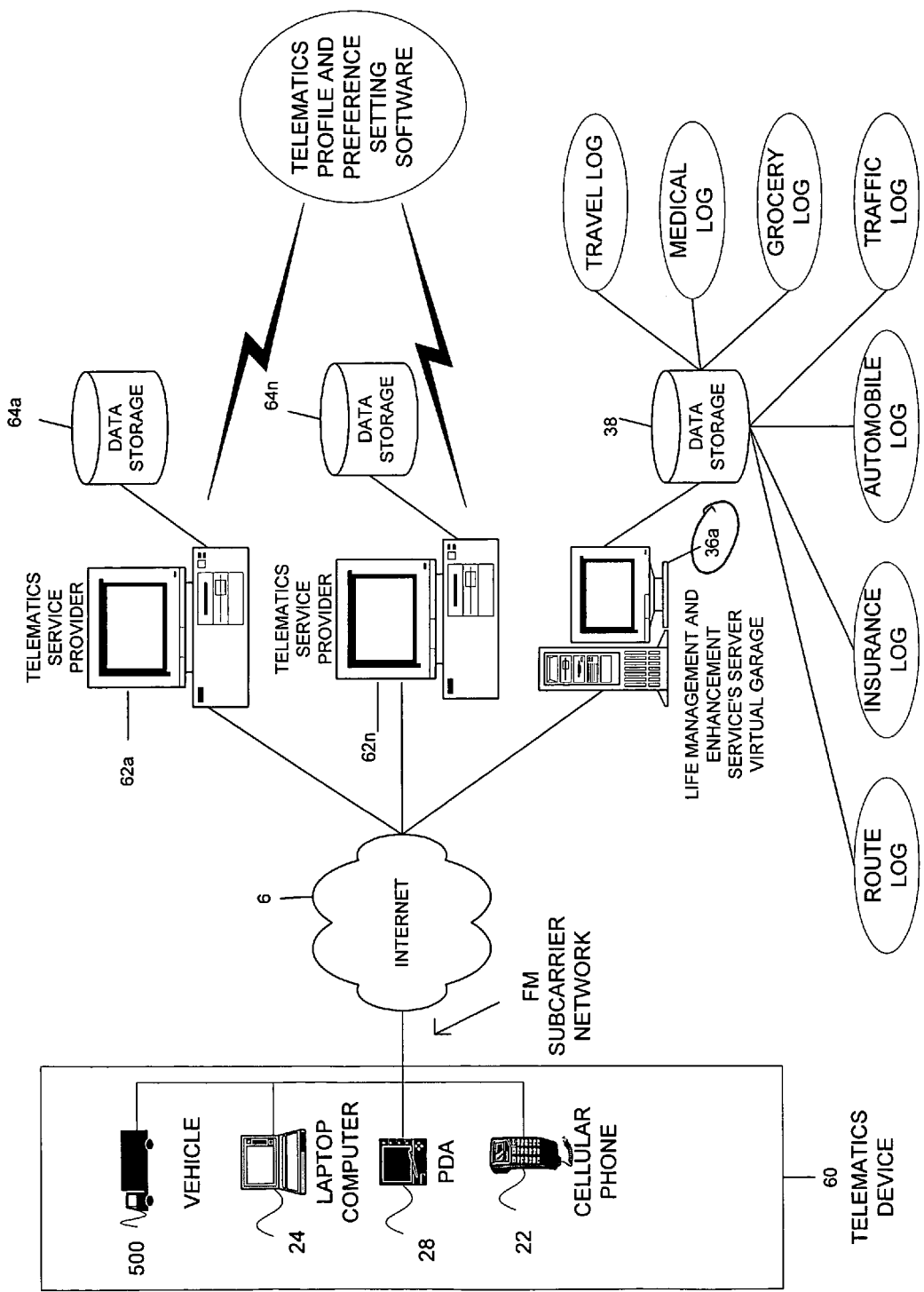
FIG. 6 illustrates an embodiment of the present invention for telematics services in accordance with the preferred embodiment of the present invention.

FIG. 6 illustrates an embodiment of the present invention for telematics services in accordance with the preferred embodiment of the present invention. This embodiment can be used for emergency roadside data services and other on-board (automobile) services (e.g., grocery services) using telematics systems. In other words, the customer can access the telematics device 60 for on-board data applications for emergency roadside data services and other on-board (automobile) services (e.g., grocery services) using the LMES server 36a. The on-board data application can be implemented using a telematics device embedded in the vehicle 500 or other mobile telematics device such as a cellular phone 22, PDA 28, and the laptop computer 24.

In this particular embodiment, on board data application is provided to entities that provide telematics services to customers. Such entities include automobile companies such as GM or Ford or insurance companies such as AAA. The LMES server 36a can be thought of as a virtual garage for centralizing data from the various telematics service providers 62a . . . 62n. The telematics service providers 62a . . . 62n each includes a profile and preference setting software application for dynamically delivering updates and other data to the virtual garage 36a. These updates are then transmitted via an FM subcarrier network to the telematics device 60. These updates can be transmitted as batch updates on an hourly, daily, weekly, or monthly basis.

Using the virtual garage 36a, telematics service providers 62a . . . 62n, or combinations thereof, the customer can retrieve various data using the telematics device 60. For example, the customer can have access to route log (road conditions, road closure, detours, weather forecasts, conditions and warnings), insurance log (on-board data for insurance emergency contact and history), automobile log (on-board data for vehicle emergency contact and history), traffic log (incident reports, congestion information, average travel time, speed data), travel log (point of interest updates, lowest gas prices, parking space availability), medical log (on-board data for medical emergency contact and history), grocery log (lowest grocery prices, discounts and specials), and the like. The virtual garage 36a and the telematics service providers 62a . . . 62n communicate with each other via the communication channel such as the Internet 6 to exchange, retrieve, and/or transmit information.

During an emergency roadside situation associated with the customer's vehicle 500, the customer can access the on-board database through the virtual garage 36a as discussed above. In all likelihood, the customer will use an on-board (vehicle) embedded device or other portable mobile device (e.g., PDA, cellular telephone, laptop computer) to obtain the pertinent information and/or to access the virtual garage 36a. The customer can then quickly and efficiently retrieve automobile, insurance, medical, weather, traffic, emergency contact, etc. information. Grocery information such as locations of lowest prices for particular items, discounts, and the like can be retrieved from the grocery log using the telematics device 60.

In addition, when the customer requests an emergency 911 service using the telematics device 60, the customer can transmit the an-board data to a Public Safety Answering Point. In this manner, the Public Safety Answering Point will have the on-board data for the customer in order to provide the mast optimal service.

In the previous descriptions, numerous specific details and examples are set forth such as specific applications and services to provide a thorough understanding of the present invention. However, as one having ordinary skill in the art would recognize, the present invention can be practiced without resorting to the details and examples specifically set forth.

Although various preferred embodiments have been described in detail above, those skilled in the art will readily appreciate that many modifications of the exemplary embodiment are possible without materially departing from the novel teachings and advantages of this invention.

I claim:

1. A method of providing an emergency contact information of a customer using a telematics device embedded in a customer vehicle during an emergency associated with the customer vehicle, the method comprising:

accessing the telematics device embedded in the customer vehicle during the emergency associated with the customer vehicle;

establishing a communication link between the telematics device and a virtual garage, wherein the virtual garage comprises at least one server on the Internet and wherein the virtual garage stores the emergency contact information of the customer;

providing a site on the Internet that communicates with the server and that can be accessed by the customer independently from the telematics device so that the customer can specify the emergency contact information stored by the virtual garage and to be transmitted to the telematics device during the emergency;

retrieving the emergency contact information of the customer from the virtual garage using the telematics device; and transmitting the retrieved emergency contact information of the customer from the telematics device embedded in the customer vehicle to the Public Safety Answering Point so that the Public Safety Answering Point will have the customer's emergency contact information that was specified by the customer via the Internet site and retrieved from the virtual garage by the telematics device during the emergency.

2. The method of claim 1, wherein the communication link comprises the Internet.

3. The method of claim 1, wherein the communication link is a wireless connection.

4. The method of claim 1, wherein the emergency contact information is retrieved from the virtual garage to the telematics device using an FM subcarrier network.

5. The method of claim 1 further comprising requesting an emergency 911 service to the Public Safety Answering Point using the telematics device.

6. The method of claim 1 wherein the emergency associated with the customer vehicle comprises a vehicle collision.

7. The method of claim 1, wherein the Public Safety Answering Point comprises one of an emergency medical service vehicle, a police service, and a fire service.

8. The method of claim 1, further comprising:
centralizing data in the virtual garage from one or more telematics service providers.

9. The method of claim 8, wherein the telematics service provider comprises an automobile company.

10. The method of claim 8, wherein the telematics service provider comprises an insurer.

11. A method according to claim 1, further comprising:
providing a business access to additional information regarding the customer that is stored in the virtual garage so that the business can provide reverse-retailing services to the customer based on the additional information.

12. A method according to claim 11, wherein the step of providing access includes providing a customer relationship management site that is accessible to the business via the Internet and that communicates with the virtual garage.

13. A method according to claim 11, wherein the additional information includes vehicle ownership information.

14. A method according to claim 11, wherein the additional information includes customer experience information.

15. A method of providing services to a customer having a vehicle, comprising:
centralizing data in a virtual garage from one or more telematics service providers, wherein the telematics service providers consist at least of an automobile company and an insurer, and wherein the virtual garage comprises at least one server on the Internet;

dynamically delivering updates to preferences and profiles of the telematics service providers to the virtual garage;

storing emergency contact information for the customer in the virtual garage;

establishing a communication link from the vehicle to the virtual garage during an emergency associated with the customer's vehicle;

retrieving the emergency contact information of the customer from the virtual garage during the emergency; and transmitting the retrieved emergency contact information of the customer from the vehicle to a Public Safety Answering Point so that the Public Safety Answering Point will have the customer's emergency contact information that was retrieved from the virtual garage during the emergency, wherein the communication link is a wireless connection, and wherein the Public Safety Answering Point comprises one of an emergency medical service vehicle, a police service, and a fire service.

16. A method according to claim 15, further comprising:
providing a business access to additional information regarding the customer that is stored in the virtual garage so that the business can provide reverse-retailing services to the customer based on the additional information.

17. A method according to claim 16, wherein the step of providing access includes providing a customer relationship management site that is accessible to the business via the Internet and that communicates with the virtual garage.

18. A method according to claim 16, wherein the additional information includes vehicle ownership information.

19. A method according to claim 16, wherein the additional information includes customer experience information.

* * * * *

UNITED STATES PATENT AND TRADEMARK OFFICE
CERTIFICATE OF CORRECTION

| | | |
|---|---|---|
| PATENT NO. | : 7,099,835 B2 | Page 1 of 1 |
| APPLICATION NO. | : 09/748729 | |
| DATED | : August 29, 2006 | |
| INVENTOR(S) | : Lawrence E. Williams, III | |

It is certified that error appears in the above-identified patent and that said Letters Patent is hereby corrected as shown below:

Column 10, line 64, delete "an"; and

Column 11, line 32, delete "an" and insert --a--.

Signed and Sealed this

Twenty-eighth Day of November, 2006

JON W. DUDAS
*Director of the United States Patent and Trademark Office*